(12) United States Patent
Eskra et al.

(10) Patent No.: US 11,837,701 B2
(45) Date of Patent: Dec. 5, 2023

(54) BIPOLAR LEAD ACID BATTERY CELLS WITH INCREASED ENERGY DENSITY

(71) Applicant: Eskra Technical Products, Inc., Saukville, WI (US)

(72) Inventors: Michael David Eskra, Saukville, WI (US); Paula Margaret Ralston, Frederick, MD (US); Richard Thomas Johnson, Howard, CO (US)

(73) Assignee: Eskra Technical Products, Inc., Saukville, WI (US)

( * ) Notice: Subject to any disclaimer, the term of this patent is extended or adjusted under 35 U.S.C. 154(b) by 116 days.

(21) Appl. No.: 17/304,863

(22) Filed: Jun. 28, 2021

(65) Prior Publication Data

US 2022/0077506 A1 Mar. 10, 2022

Related U.S. Application Data

(62) Division of application No. 16/016,777, filed on Jun. 25, 2018, now Pat. No. 11,050,093.

(51) Int. Cl.
| | |
|---|---|
| *H01M 10/18* | (2006.01) |
| *H01M 10/10* | (2006.01) |
| *H01M 4/14* | (2006.01) |
| *H01M 4/66* | (2006.01) |
| *H01M 4/62* | (2006.01) |

(52) U.S. Cl.
CPC ............ *H01M 10/18* (2013.01); *H01M 4/14* (2013.01); *H01M 4/624* (2013.01); *H01M 4/661* (2013.01); *H01M 4/667* (2013.01); *H01M 10/10* (2013.01)

(58) Field of Classification Search
CPC ........ H01M 10/18; H01M 4/14; H01M 4/624; H01M 4/661; H01M 4/667; H01M 10/10; H01M 4/68; Y02E 60/10; Y02P 70/50
USPC ........................................................ 429/152
See application file for complete search history.

(56) References Cited

U.S. PATENT DOCUMENTS

2018/0219227 A1* 8/2018 Moomaw ................ H01M 4/82

* cited by examiner

*Primary Examiner* — Gary D Harris
(74) *Attorney, Agent, or Firm* — Ziolkowski Patent Solutions Group, SC

(57) ABSTRACT

A bipolar lead acid battery with increased energy density is provided. The battery includes a number of lead acid wafer cell that each comprise a negative electrode having a negative electrode plate and a negative active material positioned on the negative electrode plate, as well as a positive electrode having a positive electrode plate and a positive active material positioned on the positive electrode plate. The positive electrode plate comprises a metal foil with a conductive film thereon, such as a titanium foil or substrate with a titanium silicide coating thereon. The lead acid wafer cell also includes a separator between the negative and positive electrodes, wherein the separator includes an electrolyte for transferring charge between the negative and positive electrodes.

20 Claims, 5 Drawing Sheets

BIPOLAR LEAD ACID BATTERY CELLS WITH INCREASED ENERGY DENSITY

CROSS-REFERENCE TO RELATED APPLICATIONS

The present application is a division of and claims priority to U.S. patent application Ser. No. 16/016,777, filed Jun. 25, 2018, the disclosure of which is incorporated herein by reference in its entirety.

GOVERNMENT RIGHTS IN THE INVENTION

The U.S. Government has a paid-up license in this invention and the right in limited circumstances to require the patent owner to license others on reasonable terms as provided for by the terms of W56HZV-16-C-0059 awarded by US Army TARDEC.

BACKGROUND OF THE INVENTION

Embodiments of the invention relate generally to lead acid batteries and, more particularly, to bipolar lead acid batteries having desirable energy density, specific energy, and discharge cycle characteristics.

The lead-acid battery in its various configurations is a well-known power source for diverse applications such as starting-lighting-ignition (SLI), uninterrupted power supply (UPS), and motive power. A typical lead-acid battery includes a plurality of individual cells each including positive and negative electrodes, a separator, and an electrolyte (e.g., aqueous acid solution). The electrodes include grids that are primarily constructed of lead and alloying materials that improve their mechanical characteristics, with positive and negative active material pastes being added to the electrode grids to form the positive and negative electrodes. The two essential functions of the grids are to mechanically support the active materials and to conduct electrical current to and from those materials. Each of the electrodes further include a grid lug or tab extending up therefrom, with lugs of the positive electrodes being connected in parallel via a positive strap and lugs of the negative electrodes being connected in parallel via a negative strap such that the individual cells can be connected in series by these conductive links via intercell connectors, either welded or by other means from positive strap to negative strap of the adjacent cell, or vice-versa to the other adjacent cell. The connected cells are then packaged in a cylindrical or prismatic housing to form the multi-cell battery with end cell straps being terminated through the battery cover or case to external terminals.

The above described construction of a lead acid battery provides for good sealing of the individual cell compartments and for reliable operation. However, such a construction allocates a large fraction of the multi-cell battery's weight and volume to current transport and packaging and, thus, does not make full use of the energy storage capability of the active components of the cell. Additionally, the inclusion of the conductive links (lugs and connecting straps) in the battery increases internal resistance in the battery. Thus, the weight and volume of the packaging and the high levels of internal resistance resulting from the lugs and straps limits the energy storage capacity and power delivery of the battery on a weight and volume basis. Still further, it is well known that the low utilization efficiency of the active mass, especially on the positive electrode, in conjunction with the heavy weight of the lead current collectors/substrates, limits the actual specific energy of the lead-acid battery.

Therefore, it would be desirable to provide a lead acid battery having desirable energy density, specific energy, and discharge cycle characteristics, with such characteristics being achievable via elimination of non-electrochemically functional metallic lead in the battery, including lead current collectors/grids, as well as elimination of terminals and straps. Elimination of these materials/components allows for increased volume and mass in the lead acid battery to be used for active energy storage materials, thereby providing a lead acid battery with a higher energy density.

BRIEF DESCRIPTION OF THE INVENTION

In accordance with one aspect of the present invention, a lead acid wafer cell for forming a bipolar lead acid battery is provided. The lead acid wafer cell includes a negative electrode having a negative electrode plate and a negative active material positioned on the negative electrode plate, and a positive electrode having a positive electrode plate and a positive active material positioned on the positive electrode plate. The positive electrode plate comprises a titanium substrate with a titanium silicide coating thereon. The lead acid wafer cell also includes a separator between the negative and positive electrodes, wherein the separator includes an electrolyte for transferring charge between the negative and positive electrodes.

In accordance with another aspect of the present invention, a bipolar lead acid battery includes a stack of at least two cells electrically arranged in series with a positive face of each cell contacting a negative face of an adjacent cell. Each of the cells further includes a negative electrode having a negative electrode plate and negative active material, a positive electrode having a positive electrode plate and positive active material, a separator between the electrodes, wherein the separator includes an electrolyte, and a cell enclosure surrounding the negative and positive electrodes and the separator that seals the cell so as to contain the electrolyte within the cell, the cell enclosure including a plurality of perforations therein that provide for electrical connectivity between adjacent cells. The positive electrode plate of each cell comprises a metal foil with a conductive film thereon.

In accordance with yet another aspect of the present invention, a positive electrode of a bipolar lead acid battery cell includes a positive electrode plate comprising a titanium substrate having a titanium silicide coating thereon, a positive active material positioned on the positive electrode plate adjacent the titanium silicide coating, and a layer or additive of lead oxide material between the titanium silicide coating and the positive active material that lowers an initial dielectric effect between the positive electrode plate and the positive active material.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a bipolar lead acid battery having desirable energy density, specific energy, and discharge cycle characteristics. In each cell of the battery, non-electrochemically functional metallic lead is removed and the mass fraction of the active energy storing lead is increased in order to achieve these characteristics. Additionally, a conductive, chemically and electrochemically stable and durable bi-pole substrate composite is provided in the cell to support the positive and negative active masses while providing inter-cell electronic conductivity between them.

Figure 1:
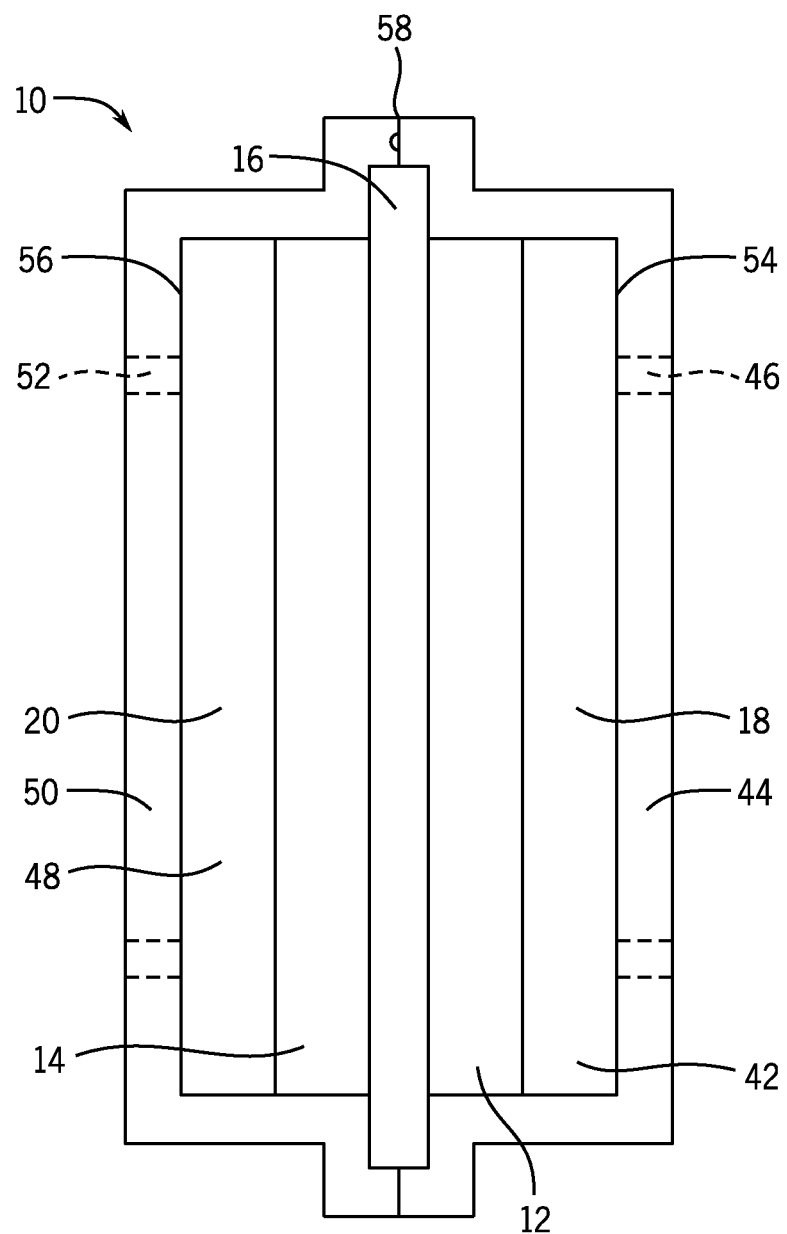
FIG. 1 is a schematic view of a lead acid wafer cell, according to an embodiment of the invention.

Hereinafter, a bipolar or pseudo-bipolar lead acid battery will be described with reference to drawings. Referring now to FIG. 1, a schematic illustration of an exemplary lead acid wafer cell 10 (hereinafter, "cell 10") that forms part of a bipolar or pseudo-bipolar lead acid battery (hereinafter, "lead-acid battery") is provided. The cell 10 includes a negative electrode 12 and a positive electrode 14 that are prevented from coming into direct physical contact with each other by a separator 16 and that are contained between two outer layers: a first electrically conductive lamination 18 and a second electrically conductive lamination 20 that make electrical contact to the negative and positive electrodes 12, 14, respectively. The electrodes, 12, 14, the separator 16 between the electrodes and the two outer laminations, 18, 20, are each substantially flat and in tight physical contact with the adjacent component in the cell 10, thereby advantageously permitting construction of a thin cell.

Figure 2:
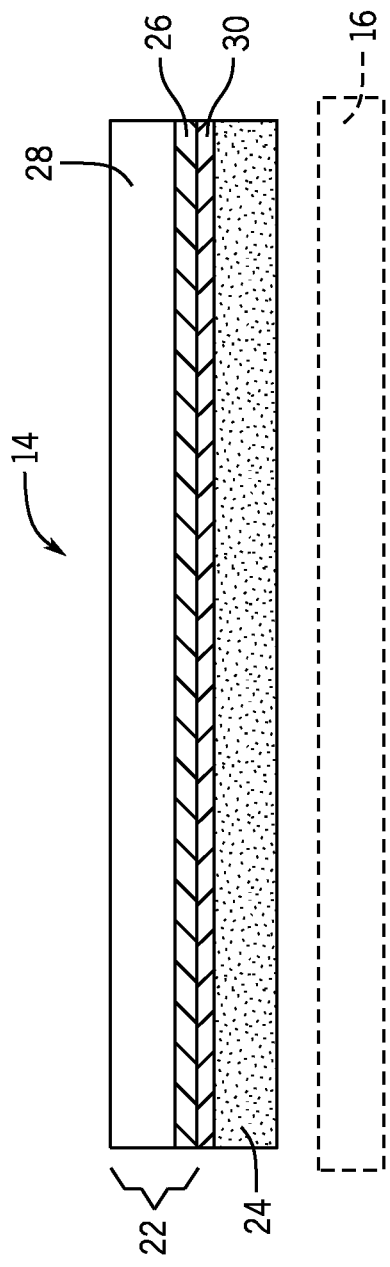
FIG. 2 is a detailed view of a positive electrode included in the wafer cell of FIG. 1, according to an embodiment of the invention.

According to an exemplary embodiment, and as shown in more detail in FIG. 2, the positive electrode 14 includes a positive electrode plate 22 and a positive active material 24. The positive electrode plate 22 is obtained by forming a conductive film 26 on the surface of a positive substrate 28. According to an exemplary embodiment, the positive substrate 28 is a thin foil made of titanium and the conductive protection film 26 is made of titanium silicide ($TiSi_2$) (i.e., a titanium silicide layer 26). A pore-free coating of the titanium silicide layer 26 may be applied to the titanium substrate 28 via a chemical vapor deposition (CVD) method according to an exemplary embodiment, but could also be applied via other suitable techniques, such as a dry electrostatic spray process described in U.S. application Ser. No. 13/617,162, with the titanium silicide being sprayed as a sole component or mixed with a suitable binder (e.g., PVDF). According to still other embodiments, the titanium silicide layer 26 could be applied via other powder coating, flame spraying, electrochemical deposition, ablation or conversion techniques. According to one embodiment, the titanium substrate 28 has a thickness of 0.1 mm and titanium silicide layer 26 on the face of the titanium substrate 28 having contact with the positive active material 24 is preferably 50 nm or thicker.

According to one embodiment, the positive active material 24 is a plate-form active material containing mainly lead dioxide and obtained by producing an active material paste. The active material paste can be obtained by a common production method used in lead-acid battery fabrication, such as by kneading a lead powder, water, and diluted sulfuric acid and carrying out chemical conversion and charging, with the active material paste being arranged while being brought into contact with a face of the positive electrode plate 22. According to one embodiment, sodium sulfate ($Na_2SO_4$) may also be added to the active material paste as a pore-former.

With regard to the interaction between the positive electrode plate 22 and active material 24, the construction of positive electrode plate 22 from a titanium substrate 28 and titanium silicide layer 26 may result in a dielectric effect being present between the positive electrode plate 22 and active material 24 that prevents the active material 24 from forming out and discharging from the positive electrode 14. That is, the presence of the titanium silicide layer 26 on the titanium substrate 28 adjacent the active material 24 would allow for voltage to increase in the positive electrode 14, but no current would be output therefrom. Therefore, according to an exemplary embodiment, positive electrode 14 further includes an additional layer or additive 30 of lead tetroxide ($Pb_3O_4$) that is applied between the positive electrode plate 22 and active material 24. The layer of lead tetroxide 30 functions to breakdown or lower the initial dielectric effect that exists between the positive active material 24 and the positive electrode plate 22 (i.e., between the active material paste and the titanium silicide layer 26) and thereby improve initial conductivity therebetween.

While lead tetroxide is listed above as an exemplary layer or additive 30 to be applied at the interface between the positive active material 24 and the positive electrode plate 22 to promote conductivity therebetween, it is recognized that other suitable materials could be used, such as lead dioxide ($PbO_2$), potassium, sodium persulfates, or barium metaplumbate, for example. The inclusion of such a conductivity promoting layer/additive 30 provides for a breakdown or lowering of the initial dielectric effect that exists between the positive active material 24 and the positive electrode plate 22 (i.e., between the active material paste and the titanium silicide layer 26) and thereby improves initial conductivity therebetween.

Figure 3:
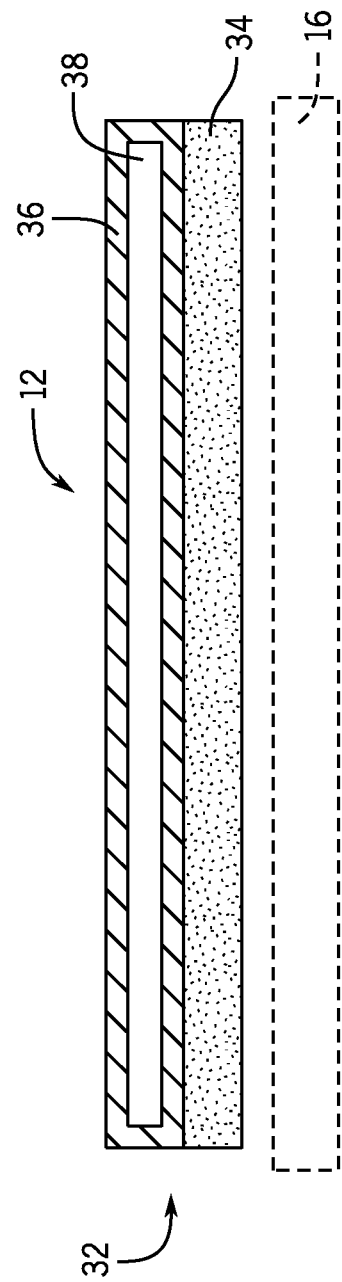
FIG. 3 is a detailed view of a negative electrode included in the wafer cell of FIG. 1, according to an embodiment of the invention.

According to an exemplary embodiment, and as shown in more detail in FIG. 3, the negative electrode 12 includes a negative electrode plate 32 and a negative active material 34. The negative electrode plate 32 is obtained by forming a conductive film or cladding 36 on the surface of a negative substrate 38. According to an exemplary embodiment, the negative substrate 38 is made of copper and the conductive film/cladding 36 is an electroplated pinhole-free lead coating/deposit—such that a pore-free, lead-clad copper negative electrode plate 32 is provided. In alternative embodiments, the negative electrode plate 32 may comprise lead-clad titanium (i.e., titanium substrate 38 with lead cladding 36), a graphite coated polymer, or a loaded polymer, with the coating being applied via a dry electrostatic spray process, for example. According to one embodiment, the lead coating 36 on the face of the negative substrate 38 having contact with the negative active material 34 is preferably 0.1 mm.

According to one embodiment, the negative active material 34 is a plate-form active material containing mainly a sponge-form metal lead. The plate-form active material 34 can be obtained by producing an active material paste, which can be obtained by a common production method of a lead-acid battery, with kneading a lead powder, water, diluted sulfuric acid, carbon, barium sulfate, and lignin and carrying out chemical conversion and charging, with the active material paste being arranged while being brought into contact with a lead-plated face of the negative electrode plate 32. According to one embodiment, sodium sulfate ($Na_2SO_4$) may also be added to the active material paste as a pore-former.

Referring again now to FIG. 1, the electrodes 12, 14 may be prevented from coming into direct physical contact with one another by use of separator 16, which extends beyond the edge of the electrodes 12, 14. That is, the separator 16 is interposed between the positive active material 24 and the negative active material 22. The separator 16 is typically made of synthetic resin fibers such as polyamide or polypropylene fibers. The separator 16 may also be made of a material including, but not limited to, inorganic layers or other suitable separator material known those skilled in the art. The separator 16 is flat and has a porous structure for absorbing and containing an electrolyte or electrolyte solution 40 within the cell 10, with the electrolyte 40 typically containing diluted sulfuric acid as a main component. The positive active material 24, the separator 16, and the negative active material 22 are impregnated with the electrolyte 40.

Figure 4:
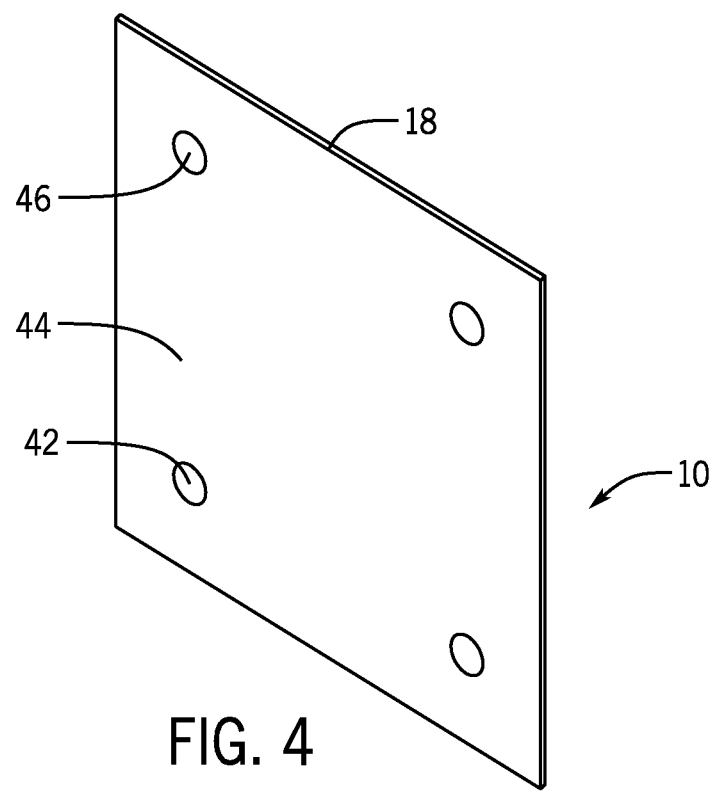
FIG. 4 a side view of an outer polymeric layer included in the wafer cell of FIG. 1, according to an embodiment of the invention.
Figure 5:
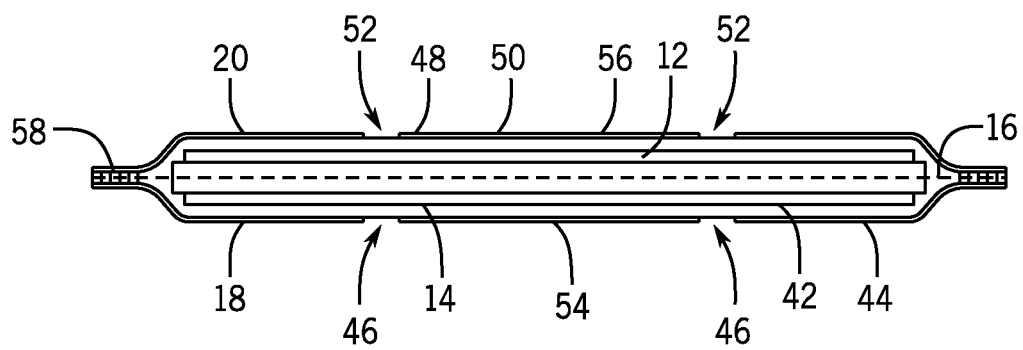
FIG. 5 shows a sectional view of the wafer cell of FIG. 1.

The electrodes, 12, 14, and separator 16 may be contained within the cell 10 by use of a first electrically conductive lamination 18 and second electrically conductive lamination 20. The first lamination 18 is equal and opposite to the second lamination 20, as shown in the embodiments of FIG. 1. The first lamination 18 comprises a first inner metal layer 42 and a first polymeric outer layer 44. The first polymeric outer layer 44 has at least one perforation 46 or opening therein, as shown in the embodiment of FIG. 1 and also in FIGS. 4 and 5, to expose the first inner metal layer 42 and provide a contact point for conduction through the cell 1. Similarly, the second lamination 20 comprises a second inner metal layer 48 and a second polymeric outer layer 50. The second polymeric outer layer 50 also has at least one perforation 52 therein to expose the second inner metal layer 48 and also provide a contact point for conduction through the cell 1. Perforations 46, 52 may be aligned with respect to each other to provide optimum conduction from cell to cell, as shown in FIG. 5.

Metal layers 42, 48 of the laminations may be made of any metallic material and in various shapes and sizes. For example, metal layers 42, 48 are each made of a thin metal foil of the same size as that of the negative electrode 12 and positive electrode 14, respectively, and aligned with the respective electrode as shown in FIGS. 1 and 5. Several layers may also be employed. Suitable materials for the metal layers 42, 48 include, but are not limited to copper, aluminum, steel, silver, nickel and mixtures thereof, including plated materials readily known to those skilled in the art. The foil thickness may be as thin as practical, for example, between about 0.0003 inches and about 0.005 inches, depending upon design specifications and to meet the needs thereof.

In order to enhance electrical contact, a conductive paste or cement such as a conductive epoxy or other suitable material readily known to those skilled in the art may be applied between each of the metal layers and the respective electrode with which it is in contact. Thin layers of conductive cement 0.0005 to 0.001 inches thick may serve this purpose.

The first and second polymeric outer layers 44, 50 of the laminations may be made of any suitable polymeric material including, but not limited to, nylon polypropylene, polyethylene, polysulfone, polyvinyl chloride and mixtures thereof, or may be composite layer comprised of two polymeric layers sandwiched about in intermediate metal layer (e.g., Al) or other oxygen barrier layer. The materials of polymeric outer layers 44, 50 need not be electrically conductive. An advantage of this feature is that the choice of material for the polymeric outer layers is therefore not limited to such a requirement. In an embodiment, each layer 44, 50 is a layer of polypropylene film, between about 0.001 and about 0.003 inches in thickness. Each layer 44, 50 may also be heat sealable and chemically stable in the cell environment.

The first polymeric outer layer 44 may be affixed to the first inner metal layer 42 to form the lamination 18 by any suitable sealing mechanism 54 which thereby creates a sealed interface. Similarly, the second polymeric outer layer 50 may be affixed to the second inner metal layer 48 to form the lamination 20 by any suitable sealing mechanism 56, which thereby also creates a sealed interface. For example, suitable sealing mechanisms 54, 56 include, but are not limited to, use of bonding agents of asphalt tar, neoprene, rubber, epoxy, cement and combinations thereof.

In one embodiment of the invention, a potential leakage path for the electrolyte from the cell 10 is along the interface between the first or second inner metal layers 42, 48 and the respective first or second polymeric outer layers 44, 50 around the edge of the metal layer to the closest location of a perforation 46, 52. To produce an effective seal, an appropriate contact material or sealant, which is chemically stable in the cell's electrolyte environment, may be applied around the edges of the perforation(s) 46, 52 in amounts such as about 0.0003 to 0.001 inches sufficient to cover the interface and thereby prevent any potential leakage. According to an exemplary embodiment, sealant comprises asphalt tar, but it is recognized that other suitable sealants could be used, including contact cements such as neoprene, rubber, epoxy, cement and combinations thereof.

In order for the electrodes, 12, 14, the separator 16 between the electrodes 12, 14, and the electrolyte 40 to be contained within an enclosed cell 10, the first and second polymeric outer layers 44, 50 of the laminations 18, 20 may have a larger physical area than the electrodes 12, 14 around the entire perimeter of the adjacent electrode, as shown in FIGS. 1 and 5. Additionally, the first and second polymeric outer layers 44, 50 which also extend beyond the inner metal layers 42, 48, respectively, are advantageously affixed to each other to provide a seal around the perimeter of the cell 10, in an embodiment of the invention. Such sealing along the perimeter, which may create a plastic-to-plastic joint 58, can be accomplished by any suitable known technique including, but not limited to, heat sealing or utilizing a cement or a filler material that bonds to the material of the polymeric outer layers 44, 50. Accordingly, this advantageously results in a sealed enclosure for the cell 10. It is recognized, however, that the enclosed cell 10 may be provided with one or more vents or relief valves to relieve excess pressure built up during deep/rapid charging, as oxygen and hydrogen gas may be generated during charging by electrolysis of water.

One skilled in the art would also appreciate that the cell 10 may be fabricated in a dry state and provided with a fill port through one of the laminations 18, 20 for vacuum filling or pressure filling which then may be sealed with an appropriate patch. In this technique, the air in the cell may be vacuumed from the filing port provided in the cell and the differential pressure will force electrolyte 40 into the pores of the electrodes 12, 14 and separator 16. Alternatively, the electrodes 12, 14 and separator 16 may be pre-moistened or pre-wet with an appropriate amount of electrolyte 40 before the afore-referenced perimeter seal is made on the cell 10. For example, the electrolyte quantity introduced into the cell 10 may fill 60 to 90% of the pore volume of the electrodes 12, 14 and separator 16.

In an embodiment of the invention, the first electrically conductive lamination 18 is in electrical contact with the outer face of the negative electrode 12 via at least one perforation 46, as shown in FIGS. 1 and 5. Similarly, the second electrically conductive lamination 20 is in electrical contact with the outer face of the positive electrode 14 via at least one perforation 52, as also shown in FIGS. 1 and 5. Thus, the lamination design including perforations 46, 52 advantageously enables electrical contact to be made to the positive and negative faces of the cell 10 from an adjacent cell or cells. The size and spacing of perforations 46, 52 may be determined by a number of design factors for optimum sealing and electrical current carrying capacity. For example, an arrangement is to keep the perforations 46, 52 at least a ¼ inch from the foil edges. The size and the perforation spacing may be determined by the electrical requirements of the cell.

The construction of the cell as described above provides a number of benefits over a traditional lead acid battery cell. The cell eliminates non-electrochemically functional metallic lead in the battery and provides a bipolar cell with a lightweight, leak-proof cell packaging. The inclusion of a titanium bi-plate coated with a silicide ceramic material (i.e., titanium silicide) on the positive electrode—along with the lead-plated copper negative electrode—provides a stable, corrosion resistant base that replaces the corrodable extraneous lead (i.e., lead grid) found in electrodes of a typical lead acid cell, thereby providing a cell with an increased mass fraction of active, energy-storing lead therein that has a high energy density and eliminates a major wearout (failure) mode and positive grid corrosion, thereby increasing battery life. Cohesion between the positive electrode plate and the positive active material paste is enabled based on the inclusion of a lead tetroxide layer or additive in the electrode, with the lead tetroxide breaking down the dielectric barrier that would otherwise be present between the titanium silicide and the positive active material paste.

While the exemplary embodiment of the cell described above is directed to a bipolar cell having a titanium silicide coated titanium substrate that supports the positive active mass and a lead-cladded copper substrate that supports the negative active mass, it is recognized that other substrates and coatings could be employed in the bipolar cell, even if such materials may exhibit reduced performance as compared to the materials specified above. As examples, the positive electrode may comprise a titanium, copper, aluminum, or other metallic substrate, or a conductive polymer substrate, coated with titanium silicide, tin dioxide, or another appropriate conductive coating/protection film, while the negative electrode may comprise a graphite coated metallic substrate of copper or titanium where the graphite is mixed with a suitable polymeric binder (e.g., PVDF) or a loaded polymer substrate with or without a graphite coating.

Figure 6:
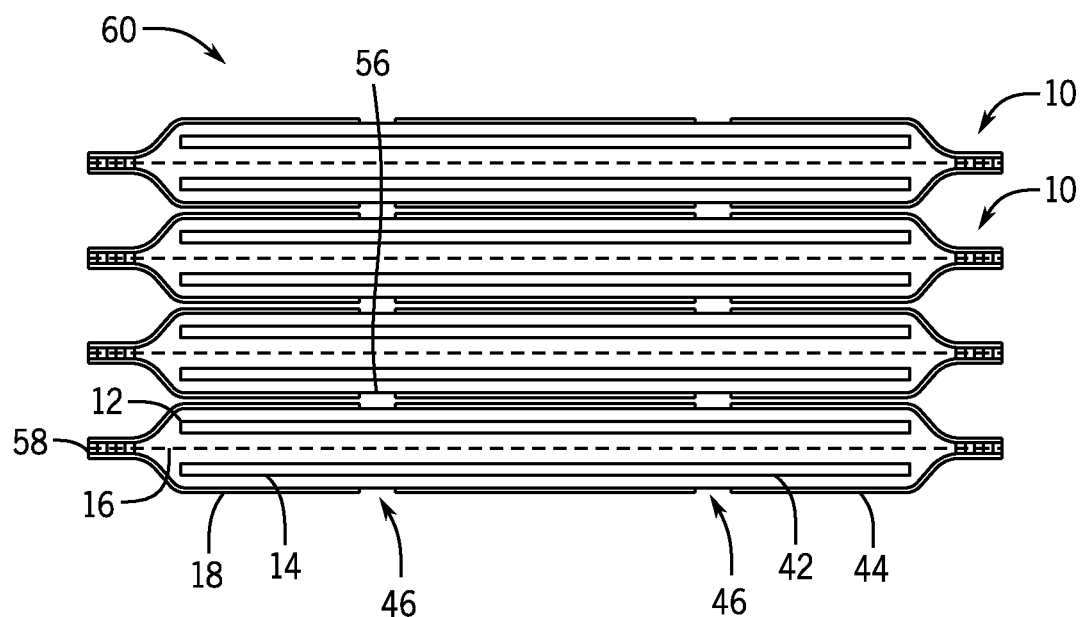
FIG. 6 shows a multi-cell stack of the wafer cells of FIG. 1 forming a lead acid battery, according to an embodiment of the invention.

Referring now to FIG. 6, an embodiment of a multi-cell battery stack 60 (i.e., lead acid battery 60) of the invention is shown therein which may be made by stacking several cells 10. The cells 10 are electrically arranged in series with the positive face of each cell 10 contacting the negative face of the adjacent cell 10. In this embodiment, the electric conduction path through the battery 60 is advantageously from the electrode to a metal foil layer, internally through the foil to a perforation, and through the perforation to the adjacent cell 10 in the stack 60.

The end cells of the battery stack 60 also may have metal foil contacts, as described in U.S. Pat. No. 5,393,617, to conduct the electric current from the battery stack to the battery terminals. The cell-to-cell contact or the contact between the end cells and the foil at the perforation points may also be enhanced by the use of a material such as conductive paste, cement, or metallic filler disk. The compact stack assembly may be held in compression to ensure uniform physical contact between the adjacent cells and between the respective layers within each cell. The stack compression may be achieved by means of rigid end plates having external tie rods wrapped around the perimeter of the stack, or by having internal tie rods that penetrate through sealed holes provided in the individual cells, as described for instance in U.S. Pat. No. 5,393,617. The holes may be sealed to prevent leakage and electrical contact between the tie rods and the electrically conductive components of the cell.

Figure 7:
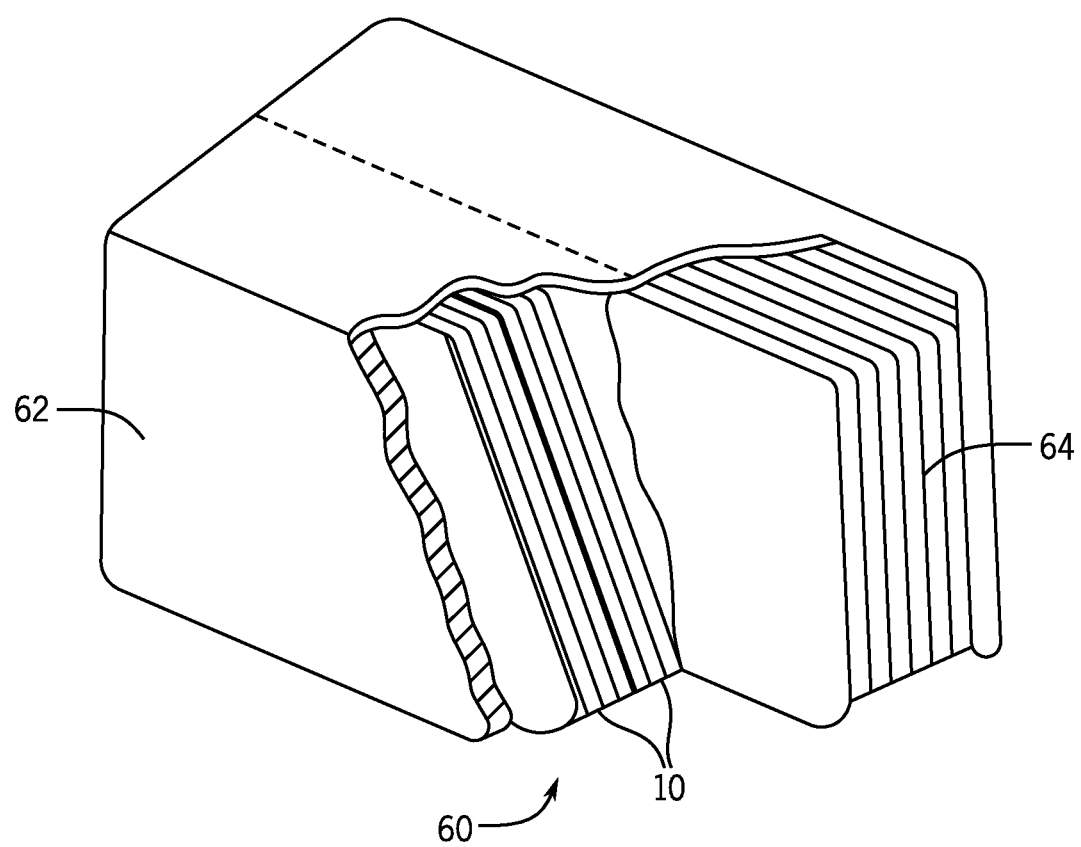
FIG. 7 shows a three-dimensional view of a multi-cell stack of wafer cells contained in an outer battery housing, according to an embodiment of the invention.

Alternatively, the stack may be contained in an outer battery housing 62, as shown in FIG. 7. To allow for electrode expansion and irregularities in the battery stack 60, the stack 60 may be held in compression by means of a layer of sponge rubber, between one or both of the metal foil contacts and the end plates of the outer housing 62. A spring or a gas-filled compressible pad 64 or bladder may be also used instead of sponge rubber. Similarly, the battery 60 may be contained in a housing with a honeycomb plate for lightweight ridge containment of a cell stack. For example, to reduce the weight of the end plates, ribbed designs or honeycomb sheets familiar to those skilled in the design of lightweight structures may be used. Also, if the cell stack is contained in an enclosed outer housing, the outer housing may serve to provide stack compression and the housing may be sealed or vented.

The multiple cells may each may have small vent ports and the cells may be contained in a sealed container which serves as the battery housing. If the cells are vented, the battery housing may be provided with a conventional pressure measuring device. Such a device may be a pressure gauge, a transducer and/or a pressure switch. The pressure measuring device may be used for monitoring the battery pressure and for regulating the magnitude and duration of the charging current during the charge cycle. Such regulation of the charging current is herein referred to as charge control. The stack may also contain internal tie rods to ensure uniform compression and contact over the entire plane of the cells. The sealed container may further have a pressure relief valve to vent internal gases. The individual cells 1 may be made according to the descriptions herein and other battery components, such as pressure gauges, etc., discussed above may be made using known methods or obtained from supply sources known to one skilled in the art.

For improved heat transfer, an additional metal foil layer or layers may be placed between or periodically between the cells, as desired. Alternatively, the cell edges may be extended to improve the thermal interface to the side walls of the battery housing. For example, for stable thermal operation, heat generated during battery operation should be removed from the perimeter of the battery. To improve internal heat transfer, an additional metal foil layer may be placed in the stack, as desired, for example such as adjacent to a metal layer and/or polymeric layer. Additionally, the cell edges may be extended to contact the side walls of the battery housing to insure thermal contact to the side walls.

Beneficially, embodiments of the invention thus provide lead acid wafer cells and multi-cell lead acid batteries having desirable energy density, specific energy, and discharge cycle characteristics. Inclusion in the cell of a conductive, chemically and electrochemically stable and durable bi-pole substrate composite to support the positive and negative active masses, along with providing inter-cell electronic conductivity between cells in the battery, allow for an increasing of the traditionally achievable lead acid battery energy density of 30 Wh/kg. Embodiments of the invention provide—at the cell level—energy density of 70 Wh/kg, specific energy to 200 Wh/L, and deep discharge cycles to 50 cycles, while the scaling up and optimization of the cells can provide—at the module/battery level—60 Wh/kg energy density, 150 Wh/L specific energy, and 300 deep discharge cycles (in a 12V 6T or 24V 4H form factor). The energy density achievable with the wafer cell structure (i.e., the materials therein and cell construction) and the interconnectivity between cells thus provides an energy density approximately double that of existing lead acid cells/batteries, with it being recognized that an energy density of 100 Wh/kg is achievable, such that a lead acid battery according to the present invention would be competitive with lithium ion battery energy densities.

Therefore, according to one embodiment of the invention, a lead acid wafer cell for forming a bipolar lead acid battery is provided. The lead acid wafer cell includes a negative electrode having a negative electrode plate and a negative active material positioned on the negative electrode plate, and a positive electrode having a positive electrode plate and a positive active material positioned on the positive electrode plate. The positive electrode plate comprises a titanium substrate with a titanium silicide coating thereon. The lead acid wafer cell also includes a separator between the negative and positive electrodes, wherein the separator includes an electrolyte for transferring charge between the negative and positive electrodes.

According to another embodiment of the invention, a bipolar lead acid battery includes a stack of at least two cells electrically arranged in series with a positive face of each cell contacting a negative face of an adjacent cell. Each of the cells further includes a negative electrode having a negative electrode plate and negative active material, a positive electrode having a positive electrode plate and positive active material, a separator between the electrodes, wherein the separator includes an electrolyte, and a cell enclosure surrounding the negative and positive electrodes and the separator that seals the cell so as to contain the electrolyte within the cell, the cell enclosure including a plurality of perforations therein that provide for electrical connectivity between adjacent cells. The positive electrode plate of each cell comprises a metal foil with a conductive film thereon.

According to yet another embodiment of the invention, a positive electrode of a bipolar lead acid battery cell includes a positive electrode plate comprising a titanium substrate having a titanium silicide coating thereon, a positive active material positioned on the positive electrode plate adjacent the titanium silicide coating, and a layer or additive of lead oxide material between the titanium silicide coating and the positive active material that lowers an initial dielectric effect between the positive electrode plate and the positive active material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bipolar lead acid battery comprising:
a stack of at least two cells electrically arranged in series with a positive face of each cell contacting a negative face of an adjacent cell, wherein each of the cells comprises:
a negative electrode including a negative electrode plate and negative active material;
a positive electrode including a positive electrode plate and positive active material, the positive plate comprising a metal foil with an electrically conductive film thereon;
a separator between the electrodes, wherein the separator includes an electrolyte; and
a cell enclosure surrounding the negative and positive electrodes and the separator that seals the cell so as to contain the electrolyte within the cell, the cell enclosure comprising a plurality of perforations therein that provide for electrical connectivity between adjacent cells.

2. The bipolar lead acid battery of claim 1 wherein the metal foil comprises a titanium foil and the electrically conductive film comprises a titanium silicide coating.

3. The bipolar lead acid battery of claim 2 wherein the titanium silicide coating is a pore-free titanium silicide coating.

4. The bipolar lead acid battery of claim 3 wherein the positive electrode plate consists of only the titanium foil and the pore-free titanium silicide coating.

5. The bipolar lead acid battery of claim 1 wherein the positive electrode further comprises an additional layer or additive of an electrical conductivity promoting material between the positive electrode plate and the positive active material that lowers an initial dielectric effect between the positive electrode plate and the positive active material.

6. The bipolar lead acid battery of claim 5 wherein the electrical conductivity promoting material comprises one or more of lead tetroxide, lead dioxide, potassium, sodium persulfates, and barium metaplumbate.

7. The bipolar lead acid battery of claim 5 wherein the positive active material of the positive electrode plate comprises a layer of active material paste; and
wherein the additional layer or additive of the electrical conductivity promoting material functions to breakdown or lower an initial dielectric effect between the layer of active material paste and the electrically conductive film.

8. The bipolar lead acid battery of claim 1 wherein the negative electrode plate comprises a lead-clad metallic substrate.

9. The bipolar lead acid battery of claim 8 wherein the lead-clad metallic substrate is a lead-clad copper substrate.

10. The bipolar lead acid battery of claim 1 wherein the bipolar lead acid battery has an energy density of 60 Wh/kg or greater, has a specific energy of 150 Wh/L or greater, and is operable for a minimum of 300 deep discharge cycles.

11. The bipolar lead acid battery of claim 1 wherein the cell enclosure comprises:
a first electrically conductive lamination comprising a first inner metal layer and a first polymeric outer layer, the first polymeric outer layer having at least one perforation therein to expose the first inner metal layer, the first electrically conductive lamination being in electrical contact with the outer face of the negative electrode; and
a second electrically conductive lamination comprising a second inner metal layer and a second polymeric outer layer, the second polymeric outer layer having at least one perforation therein to expose the second inner metal layer, the second electrically conductive lamination being in electrical contact with the outer face of the positive electrode;
wherein the first and second laminations are sealed peripherally to each other to form the cell enclosure.

12. The bipolar lead acid battery of claim 11 further comprising a layer of asphalt tar positioned between the first polymeric outer layer and the first inner metal layer and between the second polymeric outer layer and the second inner metal layer, so as to provide a sealed interface therebetween.

13. The bipolar lead acid battery of claim 11 wherein the first and second polymeric outer layers are each made of a polymeric material selected from polypropylene, polyethylene, polysulfone, polyvinyl chloride, and mixtures thereof.

14. The bipolar lead acid battery of claim 11 wherein each negative electrode, positive electrode, separator, first electrically conductive lamination, and second electrically conductive lamination is substantially flat.

15. The bipolar lead acid battery of claim 1 further comprising a battery housing that contains the stack of at least two cells therein, and wherein the stack of at least two cells is held in compression within the battery housing.

16. A lead acid wafer cell for forming a bipolar lead acid battery, the lead acid wafer cell comprising:
a negative electrode including:
a negative electrode plate; and
a negative active material positioned on the negative electrode plate;
a positive electrode including:
a positive electrode plate comprising a metal foil with an electrically conductive film thereon; and
a positive active material positioned on the positive electrode plate;
a separator between the negative and positive electrodes, the separator comprising an electrolyte for transferring charge between the negative and positive electrodes; and
a cell enclosure surrounding the negative and positive electrodes and the separator to seal the cell and contain the electrolyte within the cell.

17. The lead acid wafer cell of claim 16 wherein the electrically conductive film is pore-free.

18. The lead acid wafer cell of claim 16 wherein the cell enclosure includes a plurality of perforations therein that provide for electrical connectivity between adjacent cells.

19. The lead acid wafer cell of claim 16 wherein the positive electrode further comprises an additional layer or additive of an electrical conductivity promoting material between the positive electrode plate and the positive active material that lowers an initial dielectric effect between the positive electrode plate and the positive active material.

20. The lead acid wafer cell of claim 16 wherein the cell enclosure comprises:
a first electrically conductive lamination comprising a first inner metal layer and a first polymeric outer layer, the first polymeric outer layer having at least one perforation therein to expose the first inner metal layer, the first electrically conductive lamination being in electrical contact with the outer face of the negative electrode; and
a second electrically conductive lamination comprising a second inner metal layer and a second polymeric outer layer, the second polymeric outer layer having at least one perforation therein to expose the second inner metal layer, the second electrically conductive lamination being in electrical contact with the outer face of the positive electrode;
wherein the first and second laminations are sealed peripherally to each other to form the cell enclosure.

* * * * *